US006886108B2

(12) United States Patent
Talagala

(10) Patent No.: US 6,886,108 B2
(45) Date of Patent: Apr. 26, 2005

(54) THRESHOLD ADJUSTMENT FOLLOWING FORCED FAILURE OF STORAGE DEVICE

(75) Inventor: Nisha D. Talagala, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 647 days.

(21) Appl. No.: 09/846,801

(22) Filed: Apr. 30, 2001

(65) Prior Publication Data

US 2002/0162057 A1 Oct. 31, 2002

(51) Int. Cl.[7] .............................................. G06F 11/00
(52) U.S. Cl. ........................................... 714/5; 714/47
(58) Field of Search ........................... 714/5, 8, 42, 47, 714/54, 769, 708

(56) References Cited

U.S. PATENT DOCUMENTS

| | | | |
|---|---|---|---|
| 3,704,363 A | | 11/1972 | Salmassy et al. |
| 4,118,790 A | * | 10/1978 | Cockett et al. ............... 714/49 |
| 4,532,628 A | * | 7/1985 | Matthews ...................... 714/6 |
| 4,630,269 A | | 12/1986 | Gershenson et al. |
| 4,888,691 A | | 12/1989 | George et al. |
| 4,949,036 A | | 8/1990 | Bezinque et al. |
| 5,166,936 A | | 11/1992 | Ewert et al. |
| 5,469,453 A | | 11/1995 | Glider et al. |
| 5,758,057 A | | 5/1998 | Baba et al. |
| 5,828,583 A | * | 10/1998 | Bush et al. ................. 702/185 |
| 5,859,965 A | | 1/1999 | Gittins et al. |
| 5,914,967 A | | 6/1999 | Yomtoubian |
| 5,953,352 A | | 9/1999 | Meyer |
| 5,968,182 A | * | 10/1999 | Chen et al. ..................... 714/5 |
| 6,098,190 A | | 8/2000 | Rust et al. |
| 6,167,485 A | | 12/2000 | Kedem |
| 6,381,710 B1 | * | 4/2002 | Kim ............................. 714/45 |
| 6,442,711 B1 | * | 8/2002 | Sasamoto et al. ............. 714/38 |
| 6,625,755 B1 | * | 9/2003 | Hirata et al. .................. 714/17 |
| 2002/0184557 A1 | * | 12/2002 | Hughes et al. ................. 714/8 |

FOREIGN PATENT DOCUMENTS

| | | |
|---|---|---|
| EP | 0 722 141 | 7/1996 |
| EP | 1 026 683 | 8/2000 |

OTHER PUBLICATIONS

"Quantum Smart System," Quantum.com, S.M.A.R.T. Advanced Drive Diagnostics White Paper, www.quantum.com/src/whitepapers/wp_smart_toc.htm, pp. 1–6, printed Jan. 26, 2001.
"IBM Drive Fitness Test," IBM, pp. 1–7, Aug. 1999.
"Leveraging the Benefits of Ultra 160 SCSI Technology," pp. 1–6, Nov. 1999.
"Predictive Failure Analysis," IBM Hard Disk Drives/Library/Predictive Failure Analysis, www.storage.ibm.com/oem/tech/pfa.htm, pp. 1–4, printed Apr. 24, 2001.
PCT International Search Report for International Application No. PCT/US02/13552 filed on Apr. 29, 2003.
PCT Written Opinion for International Application No. PCT/US02/13552 filed on Apr. 29, 2003.
PCT International Preliminary Examination Report for International Application No. PCT/US02/13552 filed on Apr. 29, 2003.

* cited by examiner

Primary Examiner—Robert Beausoliel
Assistant Examiner—Gabriel L. Chu
(74) Attorney, Agent, or Firm—Meyertons Hood Kivlin Kowert & Goetzel, P.C.; B. Noël Kivlin

(57) ABSTRACT

A storage device is monitored for data integrity errors and each detected data integrity error is stored in a count. When that count reaches a threshold limit, the storage device is placed into a forced failure state.

9 Claims, 6 Drawing Sheets

| Drive # | Demerit Count | Threshold Limit | Base Level |
|---------|---------------|-----------------|------------|
| 1 | 3 | 10 | 0 |
| 2 | 2 | 10 | 0 |
| 3 | 0 | 10 | 0 |
| 4 | 8 | 8 | 0 |
| 5 | 4 | 10 | 0 |

FIG. 6a

| Drive # | Demerit Count | Threshold Limit | Base Level |
|---------|---------------|-----------------|------------|
| 1 | 3 | 10 | 0 |
| 2 | 2 | 10 | 0 |
| 3 | 0 | 10 | 0 |
| 4 | 8 | 10 | 2 |
| 5 | 4 | 10 | 0 |

FIG. 6b

THRESHOLD ADJUSTMENT FOLLOWING FORCED FAILURE OF STORAGE DEVICE

FIELD OF THE INVENTION

This invention relates to data integrity in storage systems.

BACKGROUND

Computer systems typically include some form of storage system for storing data in non-volatile form. These storage systems may include a plurality of storage devices, such as magnetic hard disk drives ("disk drives"), arranged in an array such that increased storage capacity and data redundancy may be achieved. Periodically, these storage devices may experience errors of various origin. Disk drives, for example, are subject to a number of possible failures which can compromise data integrity. Certain tracks on a particular disk may be affected by defects in the magnetic recording media. Data errors can be produced by the non-uniform flying height of the read/write head over the magnetic disk. Power outages can also cause spindle-motor or servo-motor seizures. In some cases, the power supply or the controller board for a disk drive can fail completely, or a disk drive can lose functionality while the data is being written to the disk. All of these potential failures pose a threat to the integrity of data or may result in performance degradation, as error recovery systems work to repair or reconstruct lost data.

In computing systems for large data processing and data storage applications, redundant storage devices are often provided to enhance the integrity of data maintained on the system in the event of a failure of a storage device. For example, RAID ("Redundant Array of Inexpensive Disks") technology utilizes an array of disk drives which contain data and parity information distributed across each disk drive in the array. The parity information is additional information stored on the disks and can be used to reconstruct data contained on any of the disk drives in the array in the event of a single disk drive failure. In this manner, these RAID disk arrays can improve the data integrity of the storage system by providing for data recovery despite the failure of one disk drive. However, the use of a large number of inexpensive disks in an array can pose reliability issues because the predicted frequency of failure in an array is equal to the predicted failure rate for each disk drive multiplied by the number of disk drives in the array. As the total number of disk drives increases, the frequency of failure in the array increases accordingly.

Another difficulty which may be encountered when operating a storage system is determining when a particular storage device has "failed." In the event of total storage device failure, the problem storage device may simply stop responding to commands. Such a complete inability to respond may be characterized as an absolute or permanent failure. However, not all problems with storage devices manifest themselves as absolute failures. Instead, the faulty storage device may produce less catastrophic errors, in which the storage device may respond to commands, but introduce some sort of error in its response, such as reading the wrong sector of the disk platter. While absolute failures typically result in immediate cessation of storage device operation, the presence of a lesser error may not have any noticeable affect on further operations of the storage device. It may not be immediately apparent that the storage device's response to the command was faulty and erroneous data may be returned to the requesting system without warning.

SUMMARY

In accordance with embodiments of the present invention, a method of operating a storage device is provided. The method comprises detecting data integrity errors in a storage device, counting each data integrity error in a count, and when the count reaches a threshold limit, placing the storage device into a forced failure state.

In some embodiments, the storage device is a disk drive. In further embodiments, the method further comprises returning the storage device from the forced failure state to an operational state, and setting the count to a base level. In yet further embodiments, the method further comprises reconstructing data stored on the storage device in a restoration storage device. In yet further embodiments, the method further comprises decreasing the threshold limit for the storage device after placing the storage device into a forced failure state.

In accordance with other embodiments of the present invention, a storage system is provided. The storage system comprises a storage device and a demerit monitor coupled to the storage device for detecting data integrity errors in the storage device, counting each data integrity error in a count, and when the count reaches a threshold limit, placing the storage device into a forced failure state.

In some embodiments, the storage device is a hard disk drive. In further embodiments, the storage device includes a storage device controller and the demerit monitor is provided in the storage device controller.

In accordance with other embodiments of the present invention, a computer-readable medium is provided. The contents of that computer-readable medium cause a computer system to operate a storage device by performing the steps of detecting data integrity errors in the storage device, counting each data integrity error in a count, and when the count reaches a threshold limit, placing the storage device into a forced failure state.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined solely by the claims attached hereto.

BRIEF DESCRIPTION OF THE DRAWINGS

FIGS. 6a–6b show demerit count tables in accordance with embodiments of the present invention.

While specific embodiments are described and illustrated herein, these embodiments are not intended to limit the scope of the invention, which is susceptible to various modifications and alternative forms. The use of the same reference symbols in different drawings indicates similar or identical items.

DETAILED DESCRIPTION

Figure 1:
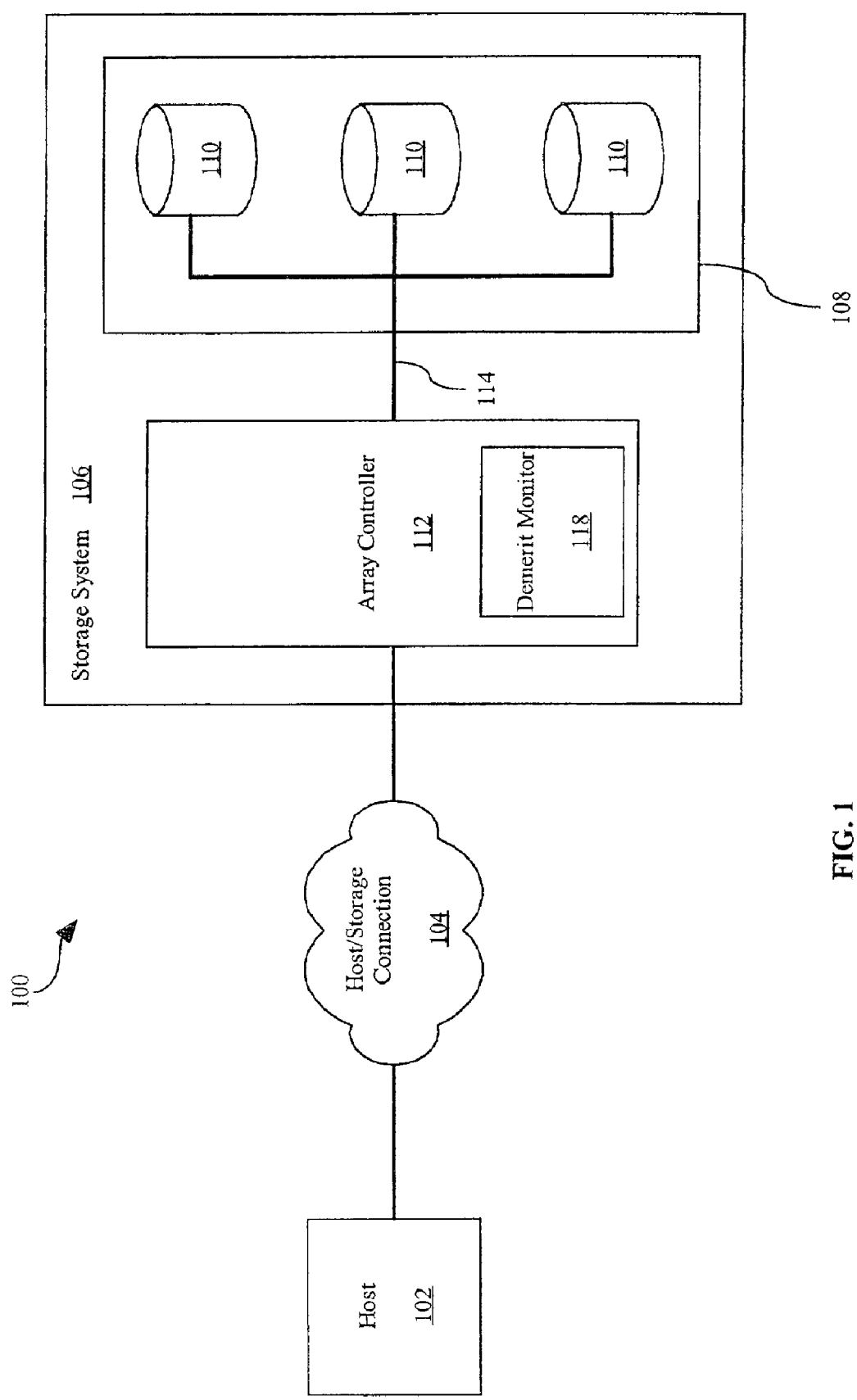
FIG. 1 shows a functional block diagram of a storage system in accordance with embodiments of the present invention.

FIG. 1 shows a functional block diagram of a data processing system 100, which includes a host 102 coupled to a storage system 106 via host/storage connection 104. Host/storage connection 104 can be, for example, a local bus, a network connection, an interconnect fabric, or a communication channel. As shown in FIG. 1, storage system 106 is a hardware RAID storage subsystem. In alternative embodiments, storage system 106 can be, for example, a JBOD ("Just a Bunch of Disks") array, a solid state storage array, a tape library, or other storage system. In various embodiments, a plurality of hosts 102 can be in communication with storage system 106 via host/storage connection 104.

Figure 2:
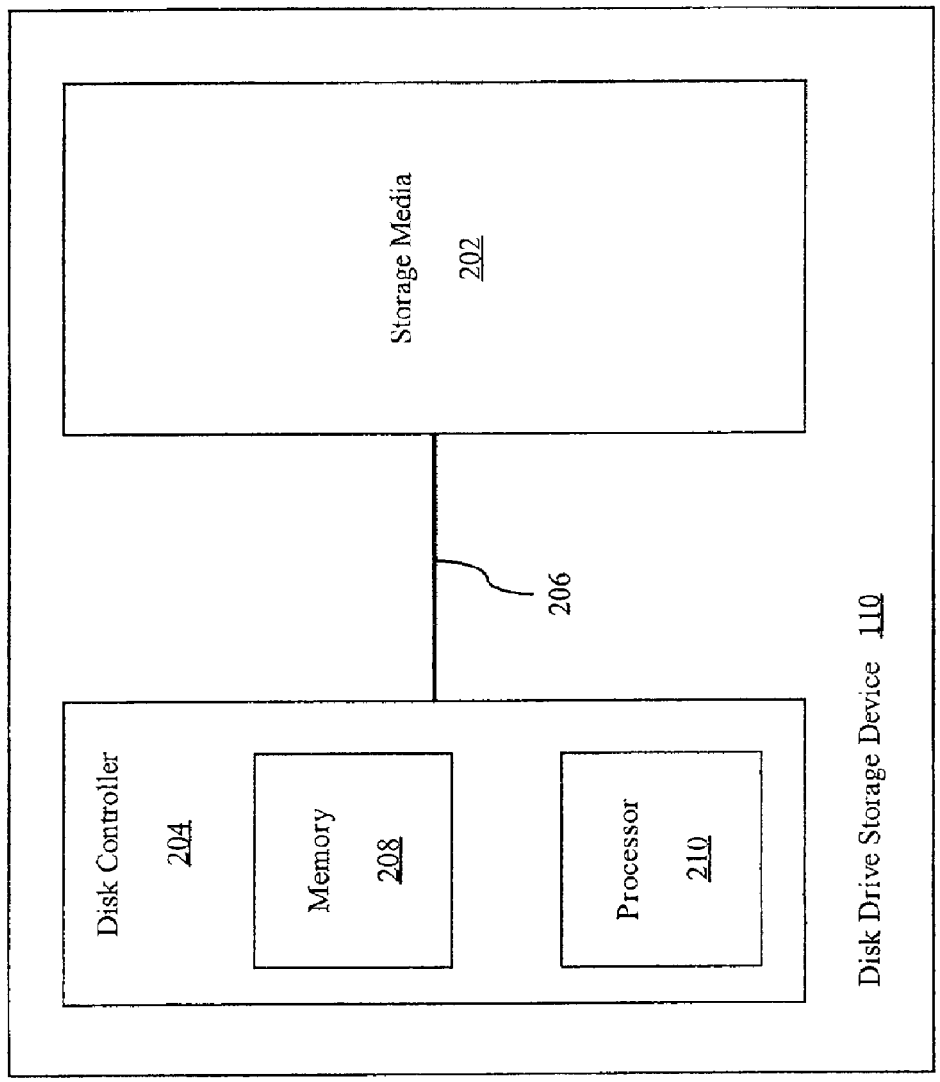
FIG. 2 shows a functional block diagram of an exemplary storage device in accordance with embodiments of the present invention.

Contained within storage system 106 is a storage device array 108 which includes a plurality of storage devices 110. Storage devices 110 can be, for example, magnetic hard disk drives, optical drives, magneto-optical drives, tape drives, solid state storage, or other non-volatile memory. As shown in FIGS. 1–2, storage devices 110 are disk drives and storage device array 108 is a disk drive array. Although FIG. 1 shows a storage device array 108 having three storage devices 110, it is understood that the number of storage devices 110 in storage device array 108 may vary and is not limiting.

Storage system 106 also includes an array controller 112 coupled to each storage device 110 in storage array 108 via data path 114. Data path 114 can provide communication between array controller 112 and storage devices 110 using various communication protocols, such as, for example, SCSI ("Small Computer System Interface"), FC ("Fibre Channel"), FC-AL ("Fibre Channel Arbitrated Loop"), SSA ("Serial Storage Architecture"), IEEE 1394, or IDE/ATA ("Integrated Drive Electronics"/"Advanced Technology Attachment").

Array controller 112 can take many forms, depending on the design for storage system 106. In a JBOD system, array controller 112 may only provide simple I/O connectivity between host 102 and storage devices 110. In more sophisticated storage systems 106, such as controller-based or hardware RAID systems, array controller 112 can also provide device control, volume management, data redundancy, and file management services. In some embodiments, array controller 112 may include a plurality of target-specific controllers, each target-specific controller being coupled to one or more of the storage devices 110. In yet other embodiments, a plurality of array controllers 112 may be provided in storage system 106 to provide for redundancy and/or performance improvements.

FIG. 2 is a more detailed functional block diagram of an exemplary disk drive storage device 110. For alternative embodiments, storage device 110 is not limited to a disk drive. Storage device 110 includes storage media 202 coupled via I/O path 206 to a storage device controller, shown in FIG. 2 as hard disk controller 204. Storage media 202 includes a plurality of magnetic platters onto which data is stored, a spindle motor for rotating the platters, a positionable actuator arm, and a read/write head located on the end of the actuator arm. Disk controller 204, sometimes referred to as servo electronics, may include a memory 208 and a processor 210. Disk controller 204 can control the rotation of the platters and the positioning of the read/write head based on formatting information and sector addresses to enable host 102 store and retrieve data from storage device 110.

Figure 3:
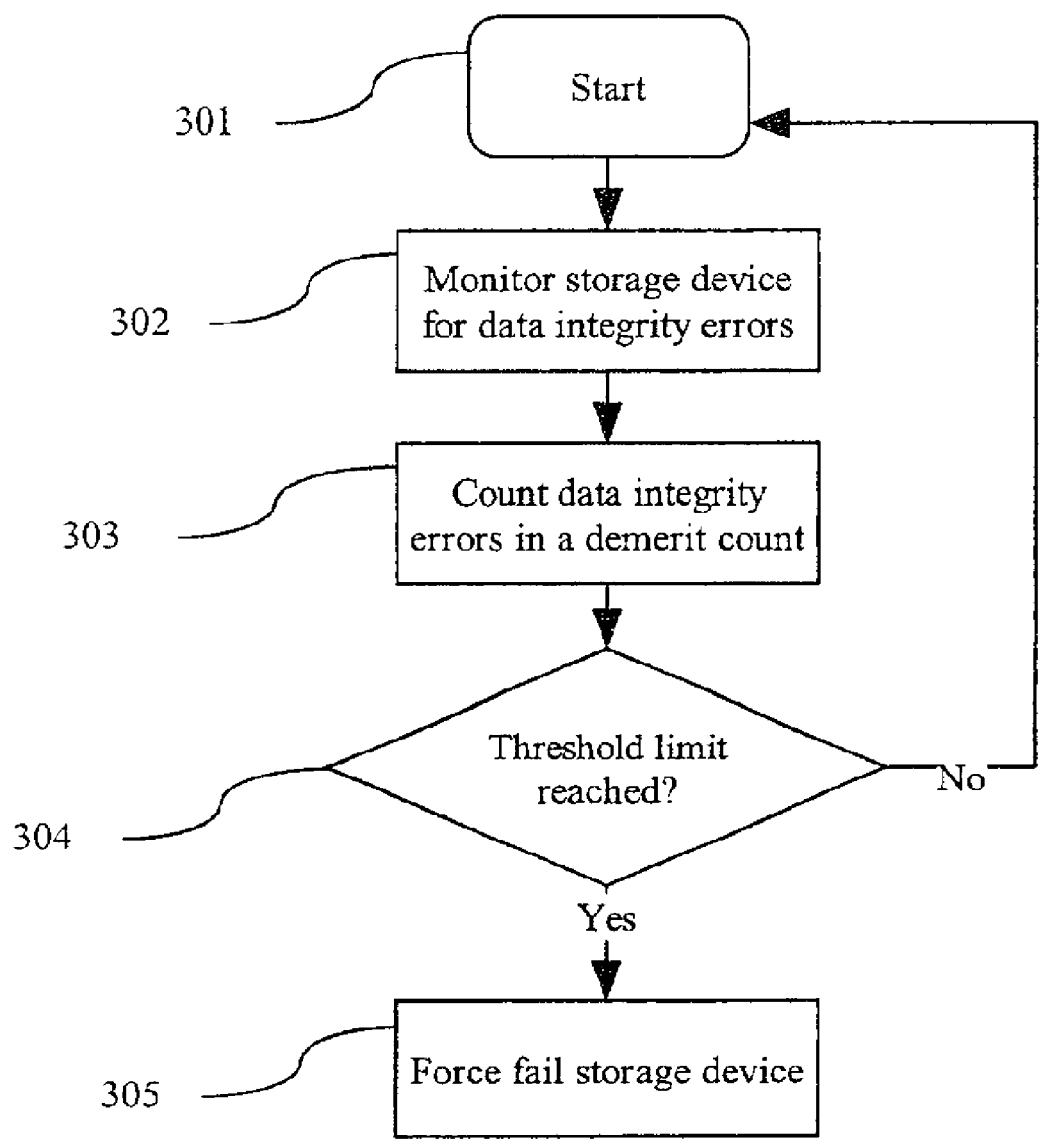
FIG. 3 illustrates a forced failure process in accordance with embodiments of the present invention.

FIG. 3 illustrates a forced failure process in accordance with various embodiments of the present invention. Starting at operation 301, data I/O ("input/output") occurs on storage system 106. In operation 302, each storage device 110 in storage system 106 is monitored for data integrity errors. Each detected data integrity error is counted in operation 303. If the demerit count reaches a threshold limit in operation 304, the storage device 110 is placed in a forced failure state in operation 305.

Figure 4:
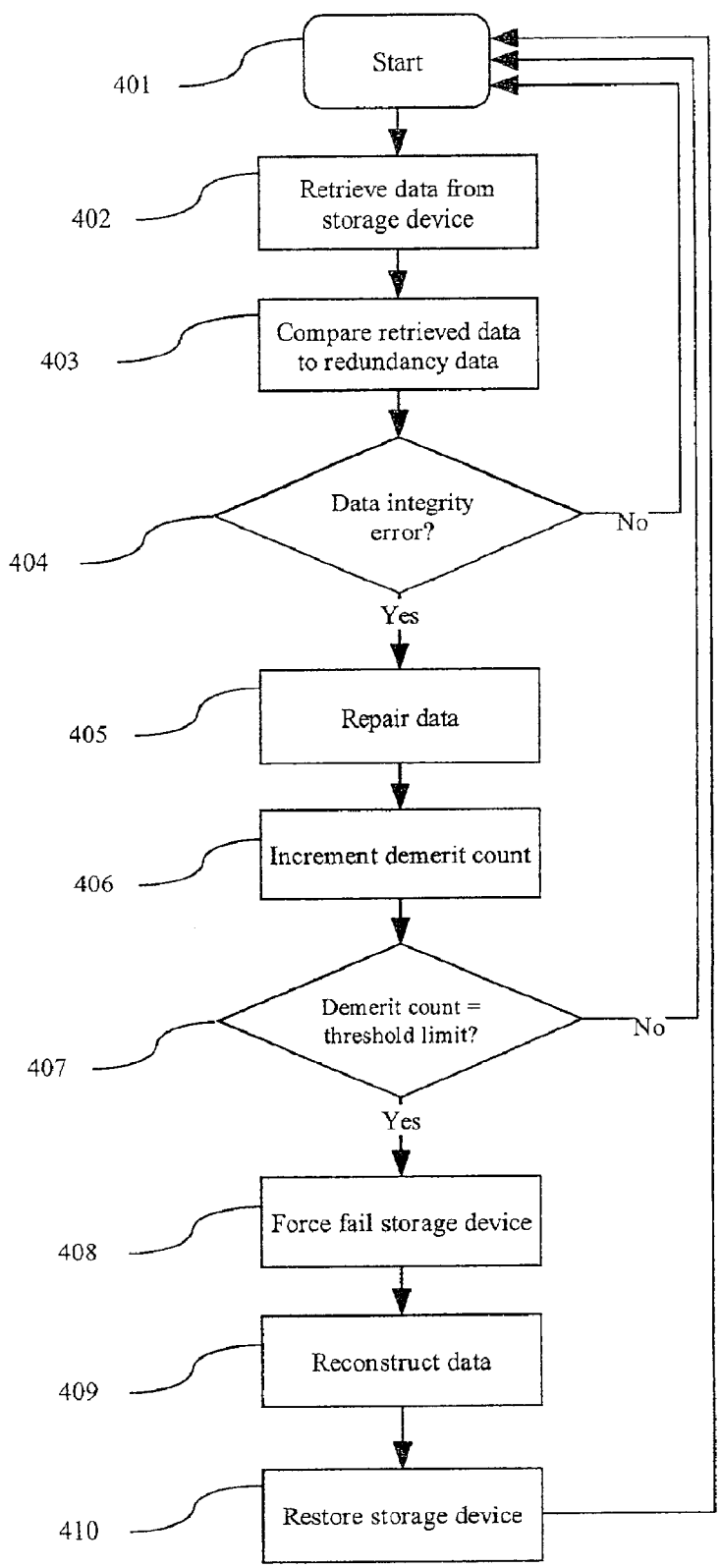
FIG. 4 illustrates in greater detail a forced failure process in accordance with embodiments of the present invention.

FIG. 4 illustrates in greater detail a forced failure process in accordance with various embodiments of the present invention. Starting at operation 401, host 102 requests a block of data from storage system 106. In operation 402, the requested block of data is retrieved from the storage device 110 which holds that data. This retrieved data is then compared to redundancy data in operation 403 to determine whether there are any data integrity errors in the retrieved data.

Data integrity errors are defined as any discrepancy between the incoming data which was sent (or written) to storage system 106 for storage in storage device 110 and the outgoing data which is retrieved (or read) from storage device 110. When storage system 106 is operating properly, the incoming data should match the outgoing data. However, various failures, examples of which are described above, can introduce errors into the retrieved data.

Data integrity errors can be identified using various techniques. In operation 403 of FIG. 4, data integrity errors are identified by comparing the retrieved data with redundancy data. If the retrieved data does not correspond with the redundancy data, a data integrity error is identified. In various embodiments, this redundancy data can be created when the incoming data is sent to the storage system 106 for storage and is stored on a different storage device than the storage device 110 which stores the incoming data. The redundancy data can be, for example, mirrored redundancy data, which comprises an exact duplicate of the incoming data. In other embodiments, the redundancy data is parity redundancy data as used in conventional RAID systems. Parity redundancy data can be calculated by performing an exclusive or (XOR) operation on some aligned group of data. In other embodiments, a checksum of each block of data stored on a particular storage device 110 is created at the time the incoming data is received from host 102 and the checksum result is written to a separate storage device 110. The checksum can be calculated by, for example, the binary addition or exclusive or operation on each of the bytes in the block of data.

In operation 403, a checksum operation is performed on the retrieved data and the results are compared to the checksum results in the redundancy data. If there is a difference between the redundancy checksum and the newly calculated checksum, then a data integrity error is identified in operation 404, and the retrieved data is then repaired in step 405. The repairing of data in operation 405 can be performed, for example, by utilizing any of the above-described redundancy techniques to restore the lost data. The repaired data is then passed to the requesting host. If the redundancy checksum and the newly calculated checksum match, then no data integrity error is identified and the retrieved data is passed to the requesting host 102.

In accordance with various embodiments of the present invention, each of the storage devices 110 in storage system 106 has a demerit count associated with it. This demerit count stores a count of the data integrity errors produced by the associated storage device 110. In operation 406, a demerit count for the error-producing storage device 110 is incremented to reflect the identification of a data integrity error in operation 404.

In operation 407, the storage device 110's demerit count is compared to a threshold limit. If the demerit count count has reached the storage device 110's threshold limit, then the storage device 110 is placed into a forced failure state in operation 408. Instead of continuing to operate the storage device 110 until a catastrophic failure occurs, a storage device 110 which has exceeded a preset limit of data integrity errors is designated as having failed and is removed from operation in storage system 106. The forced failure state can be defined as one in which general read/write commands are not directed to the drive.

The demerit threshold limit can be preset or predetermined for each storage device 110, depending, for example, on the known or predicted failure characteristics of the storage device 110 and the desired level of reliability. A small demerit threshold limit may result in an increase in frequency of storage device 110 failure, thereby decreasing system capacity due to frequent removal of storage devices 110 from storage system 106. However, because the storage devices 110 may be removed from storage system 106 prior to catastrophic failure and at a point where data reconstruction can be performed more easily, the overall reliability of storage system 106 can be improved. In some embodiments, the demerit threshold limit is set at 30. Other embodiments may have a larger or smaller demerit threshold limit.

In operation 409, the data from the force failed storage device 110 can be reconstructed on a spare restoration storage device 110'. Spare restoration storage device 110' might be provided in storage device array 108 as a backup storage device to be used in the event that one of the other storage devices 110 in storage device array 108 fails. The reconstruction can be performed in various ways. In a RAID system, standard RAID techniques can be used to restore the data. For example, using RAID 5 techniques, parity data is calculated on an aligned group of data spread across several hard drives. If one of the hard drives fails, a parity rebuild process is performed, in which the data from the remaining disks, including the parity data, is retrieved and an XOR calculation is utilized to rebuild all of the data from the failed hard drive. In other embodiments, all of the data is read from the force failed storage device 110 and checked using redundancy data. The data which matches with the redundancy data is copied to the restoration storage device, and the data which does not match can be restored using the redundancy data.

In some embodiments, the forced failed storage device 110 can be removed from storage system 106 and replaced with a new storage device 110. However, a storage device 110 which has been placed into a forced failure state in accordance with the above-described embodiments may not be seriously damaged and may be capable of continued reliable usage. Therefore, it may be desirable to repair the failed storage device 110 and return the storage device 110 back to operation in storage system 106. This restoration can occur in operation 410, which is shown in greater detail in FIGS. 5a–5b.

Figure 5A:
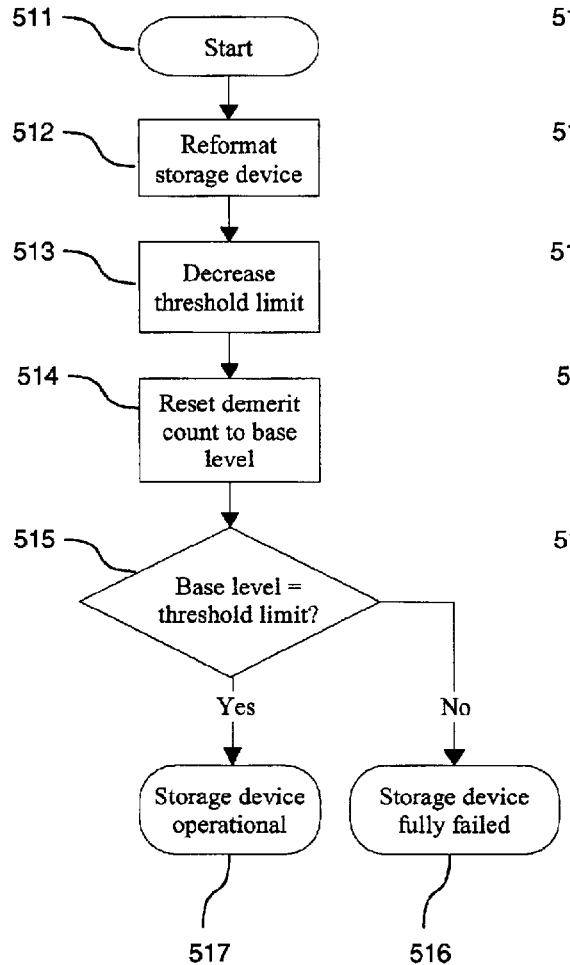
FIGS. 5a–5b illustrate storage device restoration processes in accordance with embodiments of the present invention.

In accordance with one embodiment, the restoration of the force failed storage device 110 starts in operation 511 in FIG. 5a. When using disk drives as storage devices 110, the failed disk drive can be reformatted, destroying any data remaining on storage device 110. In many cases, disk drives experiencing various types of errors can regain normal performance after being reformatted. If desired, the restored storage device 110 may then be returned to an operational state.

Alternatively, it may be desirable to proceed to operation 513, in which the threshold limit for the failed storage device 110 is decreased. This decrease can have the effect of "degrading" storage device 110, so that after storage device 110 is reintroduced to storage system 106, there is a decreased tolerance for data integrity errors. After reintroduction to storage system 106, storage device 110 will be placed into a forced failure state after fewer data integrity errors are observed. The amount of the decrease in the threshold limit can vary in different embodiments, and can be, for example, a fixed number or a percentage of the total threshold limit. The decrease can also vary with the number of restorations of storage device 110, making the decrease greater each time storage device 110 is placed into the forced failure state.

In operation 514, the demerit count for storage device 110 is reset to a base level. In one embodiment, the base level can be zero.

In operation 515, if the base level is equal to the decreased threshold limit, then storage device 110 is considered to have been so "degraded" that storage device 110 should no longer be used in storage system 106. Accordingly, storage device 110 is then placed in a fully failed state in operation 515. The fully failed storage device 110 can either be physically removed from storage array 108 or left inside array 108 but no longer used. If the base level is less than the decreased threshold limit, then storage device 110 is placed back into an operational state.

Figure 5B:
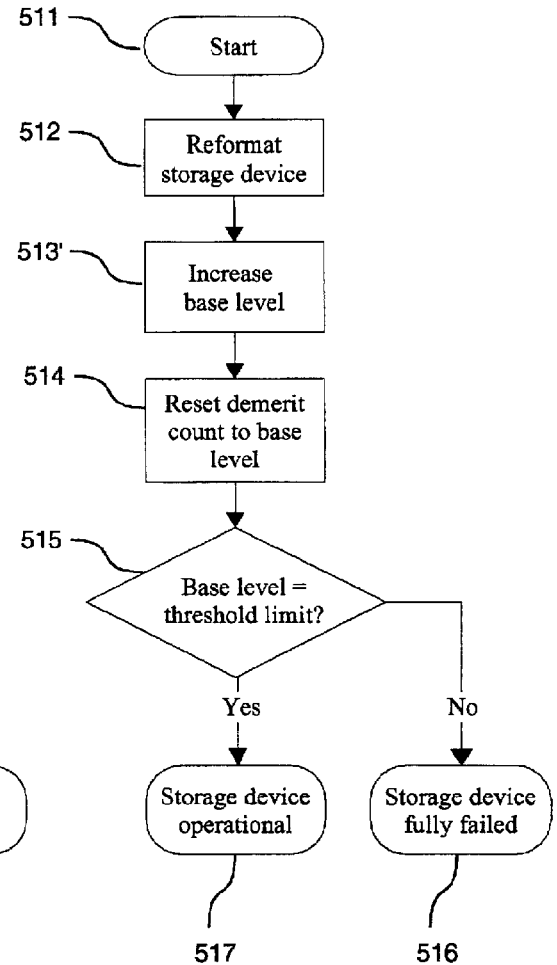

FIG. 5b illustrates the restoration of storage device 110 according to another embodiment of the present invention. Operations 511, 512, and 514–517 proceed as described above with respect to FIG. 5a. However, in operation 513', instead of decreasing the threshold limit, the base level for storage device 110 is increased. It will be understood that the "degrading" effect on storage device 110 is effectively the same if either the base level is increased or the threshold limit is decreased. In yet another embodiment, instead of comparing the base level to the threshold limit in operation 515, the reset demerit count can be compared to the threshold limit.

The processes described herein can be performed using a demerit monitor implemented in various places in data processing system 100. A demerit monitor located in disk controller 204 can store the demerit count on the storage device 110. The demerit count may then be retained by the storage device 110, even if the storage device 110 is removed from disk array 108 and introduced into another disk array. However, if disk controller 204 fails, the demerit count, threshold limit, and base level information may be lost. In other embodiments, a demerit monitor 118 can be located in array controller 112, as shown in FIG. 1, or on a host 102, as part of, for example, a host volume management system. In other embodiments, demerit monitor 118 can be located in either array controller 112 or on host 102, but the demerit count, threshold limit, and base level information may be stored on the individual storage devices.

Demerit monitor 118 may maintain a table containing the demerit count, threshold limit, and base level information for all of the storage devices 110 in array 108 in a centralized location. FIGS. 6a–6b show exemplary tables in accordance with various embodiments. In the "Drive #" column, an identifier for the storage device 110 is provided. The current number of demerits monitored for each storage device 110, the threshold limit for each storage device 100, and the base level for each storage device 100 is listed in the subsequent columns. FIG. 6a corresponds to the process illustrated in FIG. 5a, in which the threshold limit for each storage device 110 is decreased after each forced failure. It can be seen that drive 4 has failed twice and, accordingly, has a threshold limit of eight, decreased by two from the default limit of ten. Since all of the storage devices 110 have the same base level of zero, the last column may not be needed. FIG. 6b corresponds to the process illustrated in FIG. 5b, in which the base level for each storage device 110 is increased after each forced failure. Here, the base level for drive 4 is two, and the threshold limit for all of the disk drives is ten.

In accordance with various embodiments of the present invention, the demerit count can provide an objective "grade" or "quality" for the associated storage device 110, thereby enabling a reliable basis for determining "failure" in a storage device 110. As the storage device 110 produces more data integrity errors, the storage device 110's demerit count will increase. In these embodiments, the detecting of data integrity errors need not require that the storage device 110 self-diagnose its reliability status. In addition, data integrity error detection can be a storage device-independent criterion for assessing a device's performance. Different storage devices may use different protocols and error code schemes for indicating problems the device is encountering, but these schemes are not consistent across all types of storage devices and thus can cause inconsistencies when different types of storage devices 110 are used in a storage system 106. In various embodiments of the present invention, the storage device 110 is monitored for the accuracy of the data it stores and retrieves, eliminating dependency on the storage device 110 to monitor, self-diagnose, and report errors.

In accordance with another aspect of the present invention, the demerit count for a storage device 110 can be refreshed periodically. Most storage devices, particularly disk drives, experience some data integrity errors occasionally. A storage device 110 which is experiencing a large data integrity error rate should be placed into a forced failure state and restored, as described above. However, a small error rate may be acceptable for certain applications and need not result in forced failure or threshold degradation. In addition, all of the storage devices 110 may slowly accumulate demerits over an extended period of time, and if the demerit count is not refreshed, all of the storage devices 110 in storage system 106 may reach the threshold limit at approximately the same time, resulting in a mass failure of all of the storage devices 110 in storage system 106.

Therefore, if a storage device 110 does not experience a data integrity error over a predetermined period of time, i.e., the refresh period, the demerit count for that storage device 110 can be reduced. The amount of the reduction can vary in different embodiments. The demerit count can be, for example, reduced by a fixed number, reduced by a percentage of the existing demerit count, reset to the base level, or reset to zero.

In accordance with another aspect of the present invention, each storage device 110 can be fully tested for data integrity errors on a regular schedule. In many storage systems 106, much of the data stored in storage devices 110 is not accessed very often and, in some cases, may never be retrieved again. Errors which exist on these unaccessed blocks of data may not be recognized for extended periods of time. However, these unrecognized data integrity errors may still serve as indicators of problems which exist on the storage device 110, even though the data that has been corrupted is not critical.

Therefore, a periodic data integrity mass read of each storage device 110 may be scheduled. For example, all of the data stored on a particular storage device 110 can be retrieved and compared to the redundancy data to check for data integrity errors every 24 hours. Thus, if that storage device 110 has any problems, those problems will be identified in at least 24 hours. In other embodiments, the frequency of the mass read and the amount of data retrieved during that mass read can be adjusted.

While the invention has been described in terms of particular embodiments and illustrative figures, those of ordinary skill in the art will recognize that the invention is not limited to the embodiments or figures described. In particular, the methods described above can be practiced in alternative embodiments in which the order of the operations are varied. For example, the incrementing of the demerit count in operation 406 need not occur after the data is repaired in operation 405 and before the storage device 110 is force failed in operation 408. In other embodiments, the demerit count can be increased in response to other types of errors or signals, in addition to data integrity errors. This can allow storage system designers to exploit any self-diagnosing properties of storage devices 110, if desired.

Therefore, it should be understood that the invention can be practiced with modification and alteration within the spirit and scope of the appended claims. The description is thus to be regarded as illustrative instead of limiting on the invention.

What is claimed is:

1. A method of operating a storage device, comprising:

detecting data integrity errors in the storage device;

counting each data integrity error in a count;

when the count reaches a threshold limit, placing the storage device in a forced failure state;

returning the storage device from the forced failure state to an operational state, wherein said returning the storage device from the forced failure state to an operational state comprises decreasing the threshold limit for the storage device after placing the storage device into a forced failure state;

and setting the count to a base level.

2. A method of operating a storage device, comprising:

detecting data integrity errors in the storage device;

counting each data integrity error in a count;

when the count reaches a threshold limit, placing the storage device into a forced failure state;

returning the storage device from the forced failure state to an operational state, wherein said returning the storage device from the forced failure state to an operational state comprises increasing the base level after placing the storage device into a forced failure state; and setting the count to a base level.

3. A method of operating a storage device, comprising:

detecting data integrity errors in the storage device;

counting each data integrity error in a count;

when the count reaches a threshold limit, placing the storage device into a forced failure state;

returning the storage device from the forced failure state to an operational state, tracking the time elapsed after a first data integrity error;

decreasing the count if the time elapsed after the first data integrity error and before a second data integrity error is greater than a preset refresh period; and setting the count to a base level.

4. A storage system, comprising:
a storage device; and
a demerit monitor coupled to the storage device operable to:
  detect data integrity errors in the storage device;
  count each data integrity error in a count;
  when the count reaches a threshold limit, place the storage device into a forced failure state, wherein said demerit monitor decreases the threshold limit for the storage device after placing the storage device into a forced failure state;
  return the storage device from the forced failure state to an operational state; and
  set the count to a base level.

5. A storage system, comprising:
a storage device; and
a demerit monitor coupled to the storage device operable to:
  detect data integrity errors in the storage device;
  count each data integrity error in a count;
  when the count reaches a threshold limit, place the storage device into a forced failure state, wherein said demerit monitor increases the base level after placing the storage device into a forced failure state;
  return the storage device from the forced failure state to an operational state; and
  set the count to a base level.

6. A storage system, comprising:
a storage device; and
a demerit monitor coupled to the storage device operable to:
  detect data integrity errors in the storage device:
  count each data integrity error in a count;
  track the time elapsed after a first data integrity error; and
  decrease the count if the time elapsed after the first data integrity error and before a second data integrity error is greater than a refresh period;
when the count reaches a threshold limit, place the storage device into forced
  failure state, return the storage device from the forced failure state to an
  operational state; and set the count to a base level.

7. A computer-readable medium whose contents cause a computer system to operate a storage device, by performing the steps of:
  detecting data integrity errors in the storage device;
  counting each data integrity error in a count;
  when the count reaches a threshold limit, placing the storage device into a forced failure state;
  returning the storage device from the forced failure state to an operational state,
    wherein said returning the storage device from the forced failure state to an operational state comprises decreasing the threshold limit for the storage device after placing the storage device into a forced failure re state; and
  setting the count to a base level.

8. A computer-readable medium whose contents cause a computer system to operate a storage device, by performing the steps of:
  detecting data integrity errors in the storage device;
  counting each data integrity error in a count;
  when the count reaches a threshold limit, placing the storage device into a forced failure state;
  returning the storage device from the forced failure state to an operational state,
    wherein said returning the storage device from the forced failure state to an operational state comprises increasing the base level after placing the storage device into a forced failure state; and
  setting the count to a base level.

9. A computer-readable medium whose contents cause a computer system to operate a storage device, by performing the steps of:
  detecting data integrity errors in the storage device;
  counting each data integrity error in a count;
  when the count reaches a threshold limit, placing the storage device into a forced failure state;
  returning the storage device from the forced failure state to an operational state;
  tracking the time elapsed after a first data integrity error;
  decreasing the count if the time elapsed after the first data integrity error and before a second data integrity error is greater than a preset refresh period; and
  setting the count to a base level.

* * * * *